(12) United States Patent
Khoury et al.

(10) Patent No.: US 10,285,190 B2
(45) Date of Patent: May 7, 2019

(54) SCHEDULING ACCESS TO A SHARED MEDIUM

(71) Applicants: Raytheon Company, Waltham, MA (US); Raytheon BBN Technologies Corp., Cambridge, MA (US)

(72) Inventors: Joud Khoury, Boston, MA (US); Christopher Paul Vander Valk, West Chester, OH (US); Michael Brandon Kremer, Cambridge, MA (US); Subramanian Ramanathan, Westford, MA (US); Jeffery Jay Logan, Culver City, CA (US); Charles Hansen, Palos Verdes Estates, CA (US)

(73) Assignees: Raytheon BBN Technologies Corp., Cambridge, MA (US); Raytheon Company, Waltham, MA (US)

( * ) Notice: Subject to any disclaimer, the term of this patent is extended or adjusted under 35 U.S.C. 154(b) by 108 days.

(21) Appl. No.: 15/385,821

(22) Filed: Dec. 20, 2016

(65) Prior Publication Data

US 2018/0234996 A1     Aug. 16, 2018

(51) Int. Cl.
*H04W 72/04* (2009.01)
*H04W 72/08* (2009.01)
(Continued)

(52) U.S. Cl.
CPC ......... *H04W 72/1263* (2013.01); *G01S 13/66* (2013.01); *G06F 17/30958* (2013.01);
(Continued)

(58) Field of Classification Search
None
See application file for complete search history.

(56) References Cited

U.S. PATENT DOCUMENTS 5,313,214 A * 5/1994 Graziano .............. G01S 13/282
                                                      342/130
5,418,958 A * 5/1995 Goebel .................. G06F 8/441
                                                      717/156

(Continued)

OTHER PUBLICATIONS

Jakllari, Gentian, et al., "A Sync-Less Time Divided MAC Protocol for Mobile Ad-Hoc Networks", Paper ID # 901267, (2009), 7 pgs.

(Continued)

*Primary Examiner* — Alpus Hsu
(74) *Attorney, Agent, or Firm* — Schwegman Lundberg & Woessner, P.A.

(57) ABSTRACT

Generally discussed herein are systems, devices, and methods for scheduling node performance of communication and/or function. A method can include receiving, from a plurality of nodes, parameters indicating a trajectory and position of each of the plurality of nodes, creating a directed communication graph, creating a communications conflict graph, creating a function conflict graph indicating which function performed by one node of the plurality of nodes interferes with at least one of a function and communication performed by another node of the plurality of nodes, creating a universal conflict graph based on the communications conflict graph and the function conflict graph, creating a schedule for communication and function performance for each of the nodes based on the universal conflict graph, and providing data indicative of the schedule to nodes of the plurality of nodes.

20 Claims, 8 Drawing Sheets

(51) Int. Cl.
*H04W 72/12* (2009.01)
*H04L 5/00* (2006.01)
*G06F 17/30* (2006.01)
*G01S 13/66* (2006.01)

(52) U.S. Cl.
CPC ..... *H04W 72/0453* (2013.01); *H04W 72/082* (2013.01); *H04W 72/121* (2013.01); *H04L 5/006* (2013.01); *H04L 5/0016* (2013.01); *H04L 5/0073* (2013.01)

(56) References Cited

U.S. PATENT DOCUMENTS

| | | | | |
|---|---|---|---|---|
| 6,139,200 | A * | 10/2000 | Goebel | G06F 8/441 717/145 |
| 7,039,572 | B1 * | 5/2006 | Narahara | G06F 17/5036 703/14 |
| 7,773,558 | B2 * | 8/2010 | Cho | H04W 16/10 370/329 |
| 8,254,433 | B2 * | 8/2012 | Baker | G01S 7/282 375/219 |
| 2005/0149916 | A1 * | 7/2005 | Shpeisman | G06F 8/441 717/140 |
| 2009/0089139 | A1 * | 4/2009 | Rojas-Cessa | G06Q 10/0631 705/7.12 |
| 2016/0226735 | A1 * | 8/2016 | Tulino | H04L 67/00 |
| 2018/0165406 | A1 * | 6/2018 | Lin | G06F 17/5081 |

OTHER PUBLICATIONS

Khoury, Joud, et al., "An Efficient and Expressive Access Control Architecture for Content-based Networks", 2014 IEEE Military Communications Conference (MILCOM), (2014), 6 pgs.

Khoury, Joud, et al., "Efficient Private Publish-Subscribe Systems", 2014 IEEE 17th International Symposium on Distributed Computing (ISORC), (Jun. 2014), 9 pgs.

Khoury, Joud, et al., "RadarMAC: Mitigating Radar Interference in Self-Driving Cars", Proc. of IEEE SECON 2016., (2016), 49-58.

Lloyd, Errol, et al., "On the Complexity of Distance-2 Coloring", Proc. 4th International Conference on Computing and Information, Toronto,, (May 1992), 71-74.

Ramanathan, Subramanian, "A Unified Framework and Algorithm for Channel Assignment in Wireless Networks", Wireless Networks 5, (1999), 81-94.

Ramanathan, Subramanian, et al., "Scheduling Algorithms for Multihop Radio Networks", IEEE/ACM Transactions on Networking, vol. I, No. 2,, (Apr. 1993), 166-177.

Ramanathan, Subramanian, et al., "Topology Control in Multihop Wireless Networks using Transmit Power Adjustment", Proc. IEEE INFOCOM '00, (2000), 10 pp.

Redi, J., et al., "JAVeLEN—An ultra-low energy ad hoc wireless network", Ad Hoc Networks 6, (2008), 108-126.

Redi, J., et al., "The DARPA WNaN network architecture", Military Communications Conference (MILCOM'11), (2011), 2258-2263.

Urgaonkar, Rahul, et al., "Channel Assignment in Dense MC-MR Wireless Networks; Scaling Laws and Algorithms", Proceedings, IEEE INFOCOM '13, Turin, Italy, (2013), 9 pgs.

Yu, Feng, et al., "Algorithms for Channel Assignment in Mobile Wireless Networks using Temporal Coloring", Proc, ACM MSWIM, Barcelona, Spain., (Nov. 2013), 49-58.

* cited by examiner

SCHEDULING ACCESS TO A SHARED MEDIUM

GOVERNMENT RIGHTS

This invention was made with Government support under Contract Number N66001-16-C-4012. The Government has certain rights in this invention.

TECHNICAL FIELD

Embodiments discussed herein relate to devices, systems, and methods for scheduling communication and/or function performance by nodes, such as nodes that use a same frequency, frequencies, or range of frequencies to perform communication and function operations, such as at the same time.

BACKGROUND

Scheduling communication and/or other node functions in space, time, and spectrum can be challenging. Scheduling nodes to allow fair access to the available resources can be even more challenging. Scheduling the nodes to guarantee access to the node can be even more challenging yet. Some scheduling techniques generally include providing an entity with fixed access to the resources without altering a fixed access schedule. If the entity is not able to use the resources (for example, by being allocated communication time within a time slot) to perform all of the operations required within the fixed time period, the operations can continue in the next fixed time period. Moreover, if the entity has no task to perform during the assigned time, that entity's scheduled time can be wasted.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
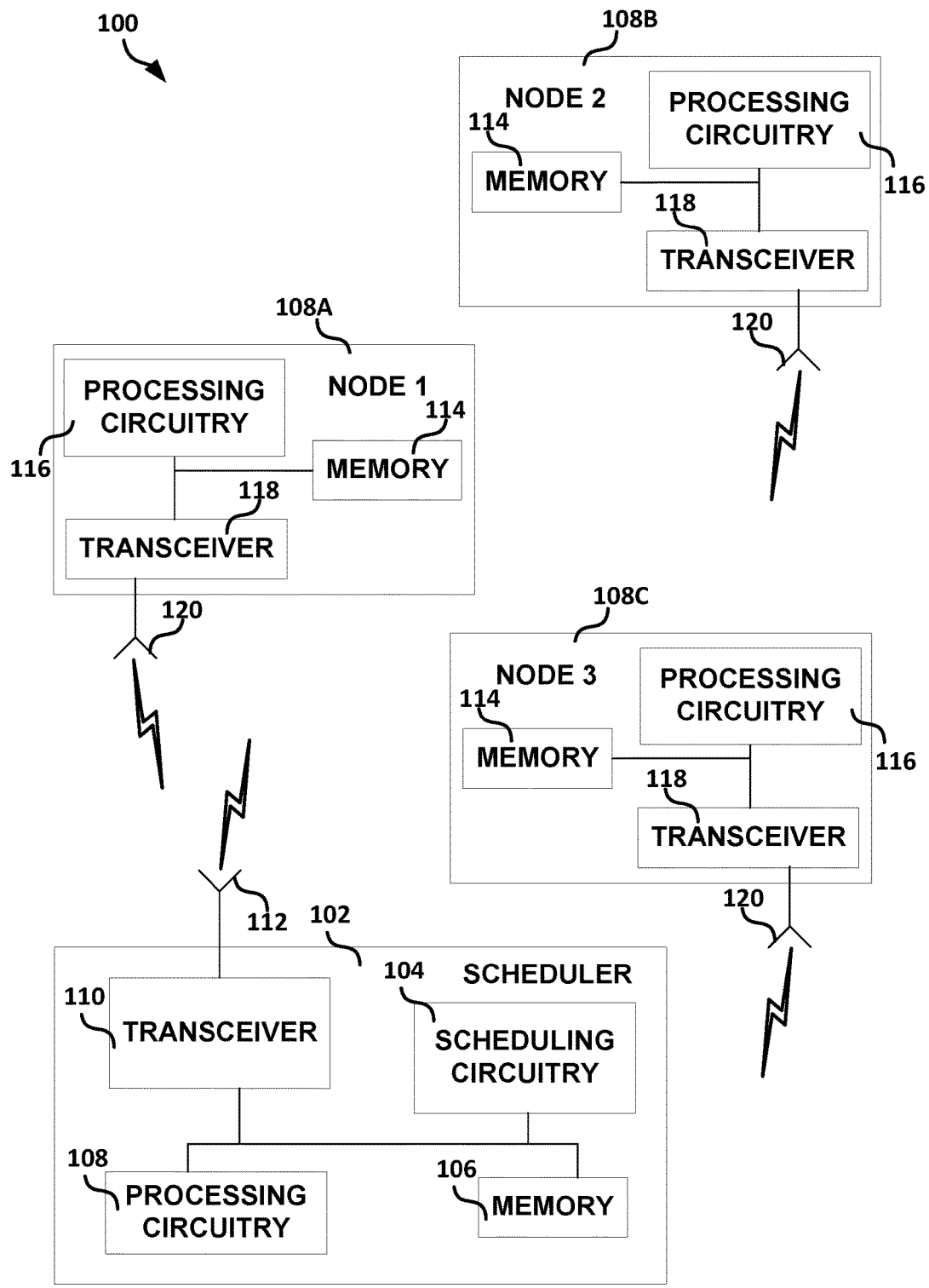
FIG. 1 illustrates, by way of example, a diagram of an embodiment of a system for coordinating transmission of multi-function waveforms.

Embodiments in this disclosure generally relate to coordination of transmission of multi-function waveforms.

Consider, for example, a radar system that includes multiple radars mounted on respective unmanned aerial vehicles (UAVs). The UAVs with mounted radars, which are examples of nodes, can perform multiple functions simultaneously, such as imaging operations using a frequency or frequency band and communication of the results of the imaging operations using the same frequency or frequency band, such as simultaneously (using the same frequency and same time frame) with performing the radar operation. The communication of the results and the performance of the operations can interfere with communication and/or function performance of another node, such as a nearby node. For example, performance of the function (e.g., radar imaging) of one radar device can interfere with communication of results (or other data) and/or performance of the function of another or the same radar device. Communication of the results of one radar device can interfere with communication of results or performance of the function of another or the same radar device. Scheduling such multi-function waveforms dynamically to perform their functions (for example both radar and communications), while minimizing the interference among the different platforms and functions is a complicated problem. Dynamic scheduling means that the schedule is not statically defined beforehand but rather is computed dynamically, such as at runtime based on the instantaneous functional needs of the platforms The complication of the scheduling can be from the coordination of multiple functions simultaneously, the movement of mobile nodes, the timing between a signal transmitted from a node and reflected signal(s) returned to a same or different node (e.g., multi-path), the frequency or frequencies with which the radars perform their function or communication of results, time of flight of a communication signal from a node to another node (sometimes referred to as a master node), flight path of a node relative to a communication signal or signal for imaging, bandwidth available for the different functions (e.g., for communication and/or radar), storage of data, and/or performance of the function of the radar, among other degrees of freedom (e.g., parameters or variables).

Waveform coordination (e.g., scheduling) is sometimes referred to as Medium Access Control (MAC). Some MAC designs assume a single function waveform that can have different parameters (degrees of freedom). A MAC system design that coordinates multi-function waveforms can be beneficial for managing devices that transmit such multi-function waveforms. Such a MAC system can help decrease interference and increase reliability of a network of nodes that includes one or nodes that transmit one or more multi-function waveforms. Embodiments discussed herein regard coordination (e.g., dynamic scheduling) of multi-function waveforms.

In one or more embodiments of systems and/or methods for coordination of multi-function waveforms (alternatively referred to as polymorphic waveforms), a system and/or method can schedule based on available degrees of freedom, such as can include time offsets, pulse repetition frequency, center frequency, bandwidth, polarization, communications subcarriers, beam direction, beam width, side lobe configuration, spreading code, power, frequency, time, and/or modulation among N platforms with co-designed multi-function waveforms (e.g., performing both radar function and communications function at the same time in a same frequency band), such as to mitigate waveform interference and promote mission effectiveness.

FIG. 1 illustrates, by way of example, a logical block diagram of an embodiment of a system 100 for centralized dynamic and/or adaptive scheduling of multi-function waveforms. The system 100 as illustrated includes a scheduler 102 communicatively coupled to the nodes 108A, 108B, and 108C. The scheduler 102 as illustrated includes scheduling circuitry 104, memory 106, processing circuitry 108, one or more transmitters and/or receivers (e.g., transceivers 110), and one or more antennas 112, communicatively coupled to each other. The one or more transceivers 110 is communicatively coupled to one or more antennas 112. The nodes 108A-C as illustrated each include memory 114, processing circuitry 116, and one or more transceivers 118 communicatively coupled to each other. The transceivers 118 are communicatively coupled to the antennas 120.

The scheduler 102 creates and distributes the schedule of node communication and function performance. The scheduler 102 includes scheduling circuitry 104 that performs operations, such as can include performing operations for determining a time or time range in which the node 108A-C can communicate and/or perform a function, determining a frequency, range of frequencies, and/or a code a node 1088A-C can use in communicating and/or performing a function. The scheduling circuitry 104 can store the schedule in the memory 106. In one or more embodiments, the schedule provided by the scheduling circuitry 104 is provided to the nodes 108A-C through one or more transmissions using the transceivers 110 and the antennas 112. The scheduling circuitry 104, in one or more embodiments, comprises instructions, which when executed by the processing circuitry 108, cause the processing circuitry 108 to perform the operations detailed by the instructions. The instructions can include instructions for determining a schedule for communication and/or function performed by the nodes 108A-C. In one or more embodiments, the scheduling circuitry 104 includes one or more logic gates, state machines, transistors, resistors, capacitors, inductors, multiplexors, diodes, or other circuitry configured to execute instructions (stored in the memory 106 or the scheduling circuitry 104) and perform operations based on the instructions.

The memory 106 can include data stored thereon that is provided by the processing circuitry 108, the transceiver 110, and/or the scheduling circuitry 104. The data can include data indicating parameters associated with a node ID. The data can be related such that a node ID is related to all the information corresponding to that node.

In one or more embodiments, the processing circuitry 108 can include a hardware processor, such as a central processing unit (CPU), an application specific integrated circuit (ASIC), a field programmable gate array (FPGA), and/or an arithmetic logic unit (ALU). In one or more embodiments, the processing circuitry 108 can include processing circuitry that can include one or more logic gates, state machines, transistors, resistors, capacitors, inductors, multiplexors, or other circuitry (such as circuitry similar to that of the scheduling circuitry 104) configured to execute instructions and perform operations based on the instructions.

A node is any device or entity that performs a function and communicates data using a same one or more frequencies. The node can include or use one or more of a sensor, a phone, an imaging device (e.g., a radar, lidar, camera, or the like), a satellite, a computer, a transceiver, a combination thereof, or a vehicle (e.g., a land, water, and/or aerial vehicle, such as an unmanned vehicle, such as an unmanned aerial vehicle that performs imaging using the imaging device) or other device or entity that performs a function and communicates, such as using a same one or more frequencies to communicate and perform their function.

The transceivers 110 include one or more transmit radios and/or one or more receive radios. Using the transceivers 110, the scheduling circuitry 102 can communicate data to the nodes 108A-C and/or the resource 122. The transceivers 110 can include a half-duplex and/or full duplex transceivers.

The antennas 112 are devices used to transmit and receive radio signals. Antennas are made of conductive material that radiates electromagnetic energy when provided with an electromagnetic stimulus. The antennas 112 are radiated by electromagnetic stimulus provided by the transceivers 110.

The memory 114 can include the same data or a subset of the data that is stored on the memory 106. The memory 114 generally includes data stored thereon that is sufficient to convey the schedule or a subset thereof to the node 108A-C.

The processing circuitry 116 is similar to the processing circuitry 108 with the processing circuitry 116 performing the same operations as or a subset of the operations of the processing circuitry 108 (in embodiments in which the nodes perform their own scheduling). The processing circuitry 116 can retrieve data from the memory 114 and/or write data to the memory 114. The processing circuitry 116 can provide data to the transceiver 118 that causes the transceiver to transmit data to another node 108A-C or the scheduler 102, such as can include a node ID, side lobe configuration, a frequency or frequencies at which the node can transmit, a code or codes which the node can use to transmit, timing of performance of communication and/or function, transmit power, orientation information (such as from a sensor of the node that is part of the processing circuitry 116), future path information (information regarding a future position of the node), or other parameter of the node 108A-C.

The transceivers 118 are similar to the transceivers 110 with the transceivers 118 converting electromagnetic radiation from the antennas 112 of another node 108A-C or the scheduler 102, or from the processing circuitry 116 of the corresponding node 108A-C, to electric signals corresponding to data to be stored in the memory 114 or used by the processing circuitry 116 to perform one or more operations.

A communication from the nodes 108A-C to other nodes 108A-C and/or the scheduler 102 can include schedule data, such as can include an ID of the node providing the communication, a demand, a frame ID, time, time range, time offset, or the like. The demand can be for a number of positions and/or a number of slots. The demand can be in the form of data per unit time that can be converted to positions or slots. A communication from the scheduler 102 can include a number of nodes to transmit in a frame (e.g., a number of slots in a frame), and/or one or more IDs of nodes with corresponding position (e.g., time) assignments. The communication from the scheduler 102 can indicate the slots in which the node(s) is scheduled to communicate and/or perform the function.

Figure 2:
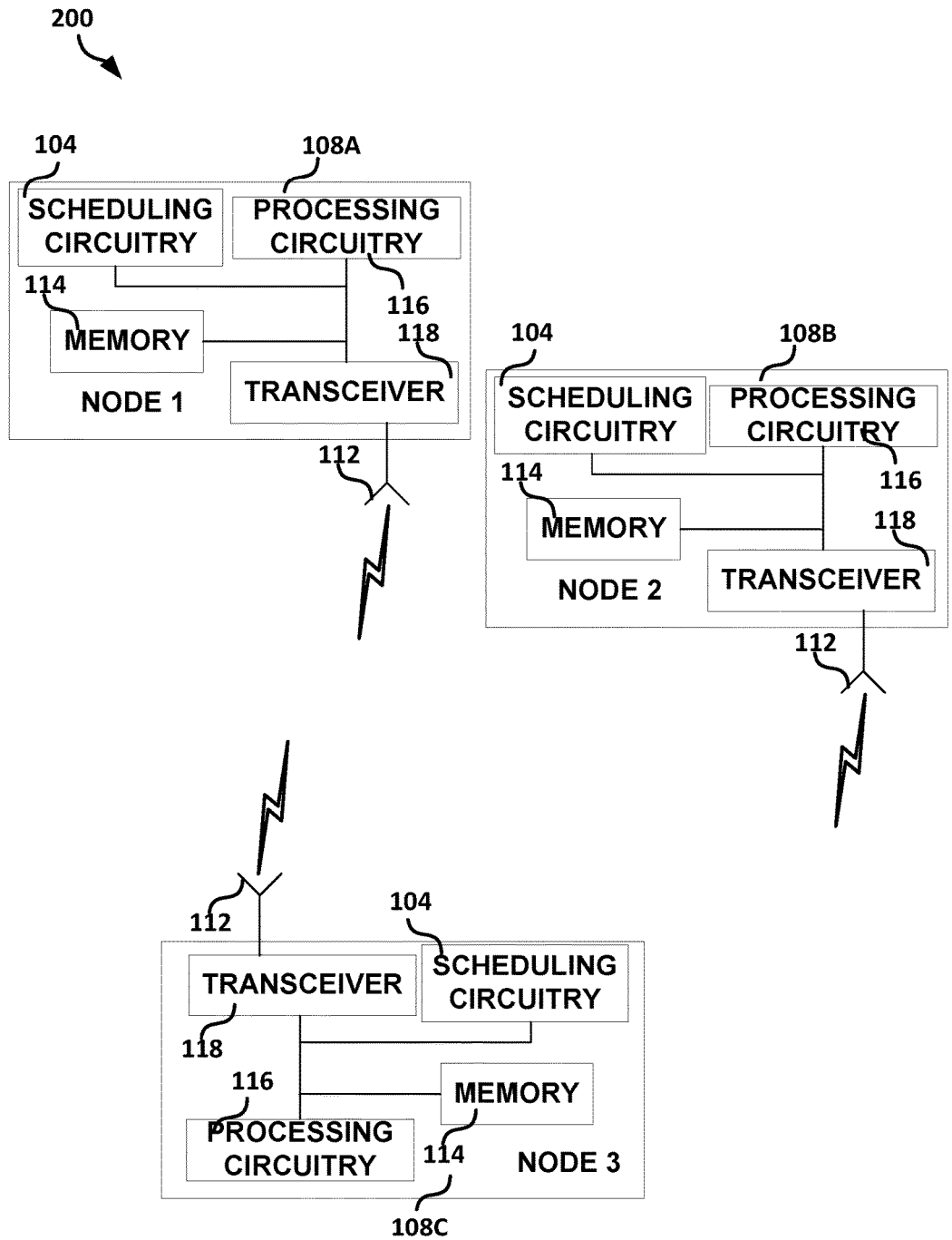
FIG. 2 illustrates, by way of example, a diagram of an embodiment of another system for coordinating transmission of multi-function waveforms.

A node that would like a greater chance of gaining more communication bandwidth can provide multiple node IDs or otherwise indicate that it would like more position(s) in a frame (e.g., slots in a frame). The node may only be allowed to provide multiple IDs or positions if one or more conditions are met. For example, if the demand of the node exceeds a threshold, or the relative demand of the node compared to the total demand exceeds a threshold, the node may be allowed to create one or more other node IDs and get multiple slot assignments in a frame the schedule FIG. 2 illustrates, by way of example, a logical block diagram of an embodiment of a system 200 for distributed dynamic scheduling of the nodes 108A-C. The system 200 is a so-called "distributed" scheduling system because each node determines the schedule independent of a master device (e.g., the scheduler 102) that determines the schedule and transmits the schedule to all pertinent entities as in the system 100 of FIG. 1. Each of the nodes 108A-C of FIG. 2 are similar to the nodes 108A-C of FIG. 1 with the nodes 108A-C of FIG. 2 further including the scheduling circuitry 104. The scheduling circuitry 104 determines resource schedule access that is used by the respective node 108A-C. A distributed scheduler can be less prone to a single point of failure than a centralized scheduler. For example, consider the system 100 and assume that the scheduler 102 becomes inoperative. The nodes may not be able to communicate or perform functions until the scheduler 102 becomes operable. Now consider the system of FIG. 2 and assume that a node becomes inoperative. The schedule would resume with the remaining nodes communicating and performing functions based on their determined schedules even without the disabled node.

Figure 3:
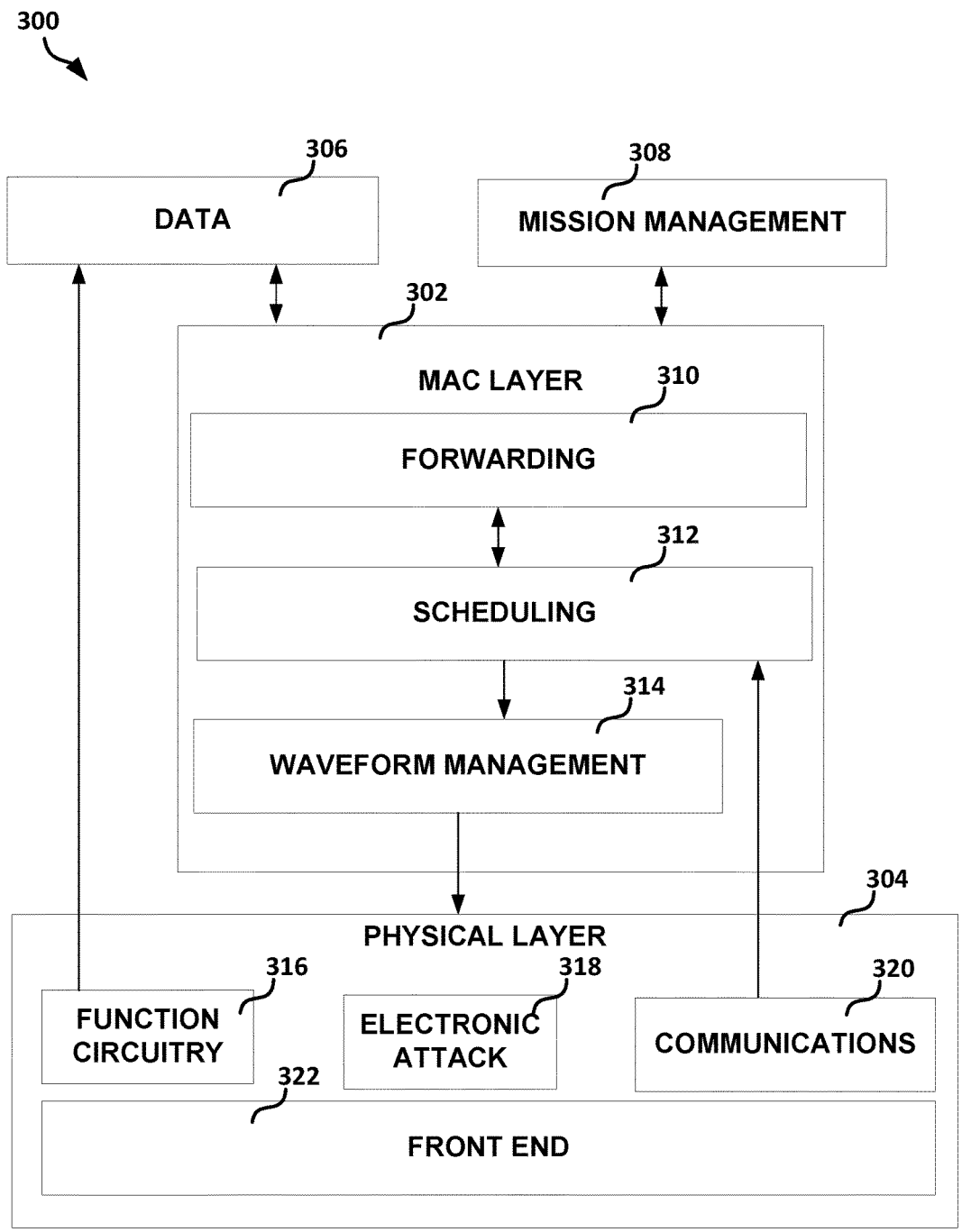
FIG. 3 illustrates, by way of example, a diagram of an embodiment of a scheduler device for coordinating transmission of multi-function waveforms.

FIG. 3 illustrates, by way of example, a diagram of an embodiment of a scheduler device 300 for dynamic scheduling of a multi-function waveform. The scheduler device 300 as illustrated includes a MAC layer 302, a physical layer 304, data management circuitry 306, and mission management circuitry 308. The MAC layer 302 as illustrated includes forwarding circuitry 310, scheduling circuitry 312, and waveform management circuitry 314. The physical layer 304 as illustrated includes function circuitry 316, electronic attack circuitry 318, communications circuitry 320, and front end circuitry 322. Each of the nodes 108A-C and/or the scheduler 102 can include one or more of the elements of the scheduler device 300 FIG. 3, such as can include one or more elements of the MAC layer 302, one or more elements of the physical layer 304, the data circuitry 306, and/or the mission management circuitry 308.

In the open systems interconnection (OSI) seven-layer model, the MAC layer 302 is a part of the data link layer. The MAC layer 302 is responsible for one or more of the following operations: (1) collision resolution, framing/deframing, frame header/trailer processing, checksum computation, checksum verification, and scheduling. The MAC layer 302 is in control of which entity gets control of a shared channel (e.g., one or more frequencies during a time frame).

The data management circuitry 306 receives data in the form of signals from the function circuitry 316 which get converted into actual data such as the actual radar imagery data. The data management circuitry 306 can perform one or more operations on the data for example to format the data in a form compatible with the MAC layer 302. The data management circuitry 306 can perform other operations on the data, such as can include encrypting the data, compressing the data, or the like. The data management circuitry 306 uses the same waveform that is used to perform radar in order to communicate the data to other nodes in the network. The MAC layer 302 coordinates the functions (radar imaging, communication) using the available degrees of freedom.

The mission management circuitry 308 manages parameters of nodes that share the medium controlled by the MAC layer 302. The mission management circuitry 306 can determine one or more trajectories of the nodes (in an embodiment that includes one or more nodes that moves relative to other nodes that access the shared media controlled by the MAC layer 302). The mission management circuitry 306 can determine parameters of one or more tasks to be performed by the one or more nodes, such as can include a function to be performed, mode in which the node is to operate, duty cycle (as a function of time), parameters of the function to be performed (frequency or frequencies to be used, timing of performing the function, or the like), and communication latency (an amount of time it will take for a communication to originate at one node and travel to a same or another node), such as can be based on the determined trajectories, positions of the nodes, among other parameters that can be determined by the mission management circuitry 308. The mission management circuitry 308 can determine priorities for one or more of the nodes, such as to aid in conflict resolution and/or aid in determination of a definite schedule.

The forwarding circuitry 310 manages routing of communications. The forwarding circuitry 310 can perform routing over multiple hops, such as to fulfill one or more of traffic demand (demand by a node to access the shared medium), communication latency, and/or node priority.

The scheduling circuitry 312 allocates available slots of the medium to nodes that share the medium. The scheduling circuitry 312 can allocate a slot based on available degrees of freedom. The allocation can be determined by solving a joint constraints problem (e.g., considering the constraints of each of the nodes that request access to or otherwise communicate over the shared medium) based on available degrees of freedom. The degrees of freedom can include spectral bandwidth available, spatial bandwidth available, and/or temporal bandwidth available. The constraints can include temporal, spatial, and/or spectral constraints. Based on the degrees of freedom and the constraints, the scheduling circuitry 312 can allocate slots in the medium. The allocation of slots is discussed in more detail with regard to the section titled "scheduling considerations" among others. The scheduling circuitry 312 can include elements and perform operations of the scheduling circuitry 104.

The waveform management circuitry 314 synthesizes a polymorphic waveform. The polymorphic waveform can be synthesized based on the allocated parameters (e.g., the temporal, spatial, spectral, function, mode, trajectory, duty cycle, communication latency, side lobe configuration, code, or other parameter).

The physical layer 304 includes networking hardware, such as one or more of a receiver, transmitter, transceiver, router, gateway, bridge, modem, wireless access point, line driver, switch, hub, repeater, network interface controller, or the like. The physical layer 304 defines how bits are to be transmitted (rather than packers as in the MAC layer 302) are transmitted between nodes. The bits can be converted to a word or symbol, converted to a waveform or signal, and transmitted using the hardware. The physical layer translates requests from the data link layer (e.g., the MAC layer 302) to hardware operations that fulfill those requests in the form of transmission or reception of signals using the hardware.

The function circuitry 316 includes hardware to perform a function of the node. The function can include imaging, such that the hardware includes a radar.

The electronic attack circuitry 318 can aid in performing another function, such as detecting jamming, or other electronic attack, on the node. Jamming is impairing the use or altering the use of an electronic device by radiating, reradiating, or reflecting electromagnetic energy. Jamming techniques, in an example of radar, can include amplifying a portion of a signal, cross polarization, circular polarization, barrage noise jamming, asynchronous pulsed jamming, angle jamming, among others. The electronic attack circuitry 318 can help detect whether jamming is occurring and take countermeasures to help ensure that the jamming is ineffective and the radar. For example, beam-to-beam correlation can be used to help reject pulse jamming and/or jamming at a swept frequency.

The communications circuitry 320 can provide an ability to perform a communication function. The communications circuitry 320 can include one or more of one or more receivers, transmitters, and/or transceivers, power amplifiers, modulators, demodulators, analog to digital converters, digital to analog converters, antennas, spread spectrum components, encoders, decoders, or the like. The communications circuitry 320 can receive and/or transmit electromagnetic energy from and/or to other nodes or itself (such as in the example of radar or other reflected electromagnetic wave technology).

The front end circuitry 322 is the hardware which can include an antenna or antenna array.

Scheduling Considerations

Inputs to the scheduling circuitry 312 can include a node ID for each of the nodes that shares the medium controlled by the MAC layer 302. Assume that there are N nodes to be scheduled. The inputs can further include a playbook for each node. The playbook can include data detailing functions to be performed by the node, such as can include the parameters previously discussed. The parameters can include the time at which the node is to perform the function (as determined by the mission management circuitry 308), a target for the function, a demand for access to the medium (as can be determined by the forwarding circuitry 310), a frequency or frequencies over which the node can communicate (as determined by the mission management circuitry 308), a code, such as a spread spectrum code or code used in a code division multiple access (CDMA) technique, a side lobe level or configuration, a transmit or receive beam direction, such as can be implemented using a phased antenna array, and/or an importance of the function to be performed (e.g., based on a concept of operations (CONOPS) from the mission management circuitry 308), a time offset between an imaging signal transmission and reception, pulse repetition frequency (PRF), transmit duty cycle, frequency offset, bandwidth, and/or modulation, among others.

The scheduling circuitry 312 can allocate spectral, spatial, and/or temporal slots of a frame based on the inputs (the inputs are sometimes referred to as constraints). The scheduling circuitry 312 can determine and/or create multiple "graphs" based on the inputs and determine a schedule based on the created graphs. The graphs can include a communications connectivity graph that is a directed graph that includes nodes represented as vertices of the graph and edges representing potential communication connections between the nodes that can be interference free (from other communications from other nodes of the system, interference from nodes outside the system are possible). See FIG. 4 for an example of a communication graph.

The graphs can include a communications interference graph (see FIG. 5 for an example of a communications interference graph) and/or a function interference graph (see FIG. 6 for an example of a function interference graph) that details a worst case interference between nodes. The scheduling circuitry 312 can organize the data of the interference graph by ability to reduce the interference and increase the signal to noise ratio (SINR). The ability to reduce the interference can include partial reduction of interference by using partially orthogonal codes, or completely, such as by using orthogonal times and/or orthogonal frequencies.

Vertices (each corresponding to one or more nodes 108A-C) can then be colored in the interference graph, and edges corresponding to communication links that include a worst case SINR over a specified threshold can be removed (indicating that communication between the two nodes is not possible or will most likely result in poor communication with too many errors). The colored graph can be translated to communication parameter assignments, such as can include one or more codes, times, and/or frequencies of the communication and/or performance of the function. The interference can then be recalculated based on the reduced colored graph (the colored graph with reduced edges).

Figure 4:
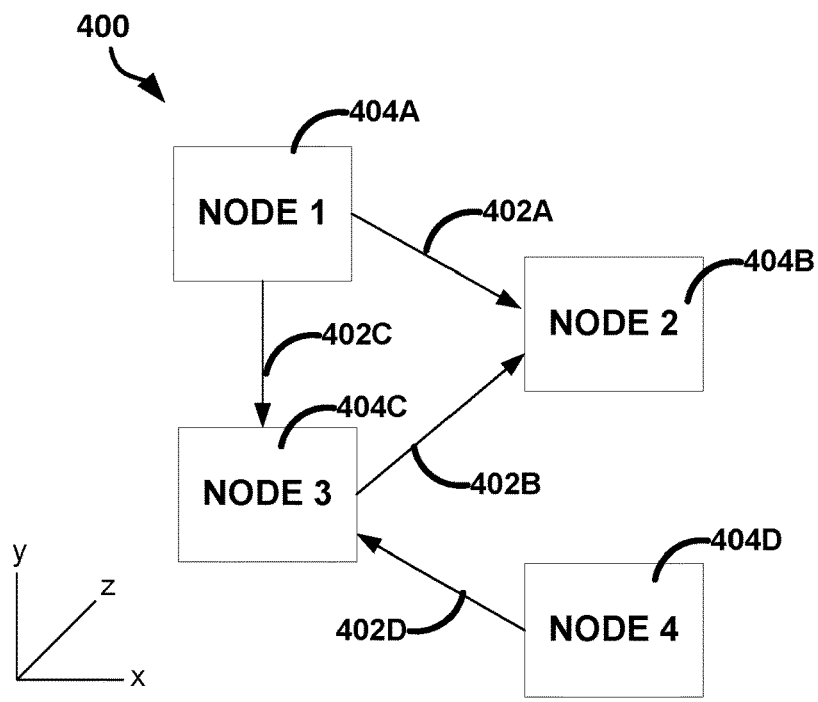
FIG. 4 illustrates, by way of example, a diagram of an embodiment of a communication connectivity graph.

The communications interference graph can be calculated, at least in part, using the connectivity graph. FIG. 4 illustrates, by way of example, an embodiment of a communications connectivity graph that includes four nodes 108A-D. Each vertex represents 404A, 404B, and 404C represents a node 108A-C. Each of the edges 402A, 402B, and 402C in the graph 400 represents a potential communication link between the corresponding nodes. Each of the nodes 108A-D is oriented relative to one another spatially (indicated by the axes "x", "y", and "z").

Figure 5:
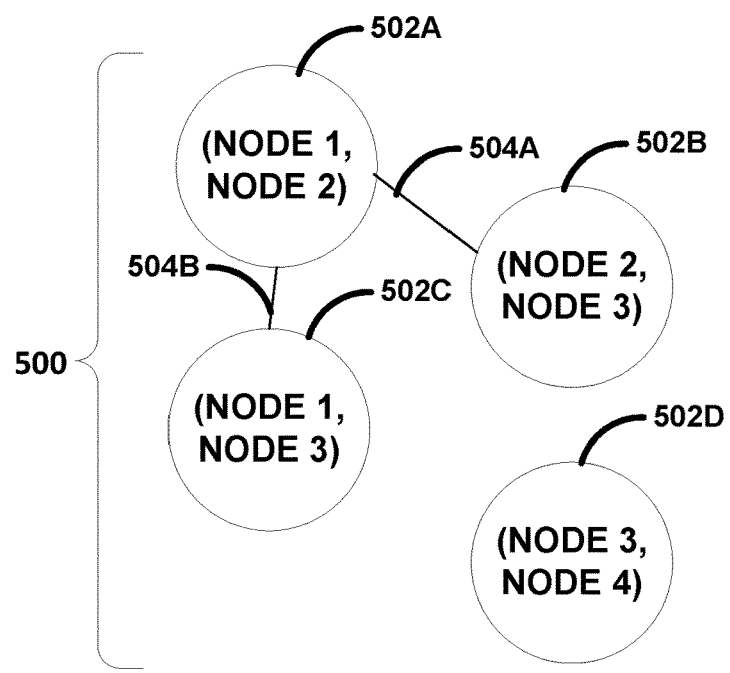
FIG. 5 illustrates, by way of example, a diagram of an embodiment of a communication interference graph.

FIG. 5 illustrates, by way of example, an embodiment of a communications interference graph 500. Each of the vertices 502A-D represents a link (an edge 402A-D) from the graph 400. For each of the vertices 502A-D, a signal strength of interference against the corresponding link from other links of the graph 400 can be determined. The determined signal strengths can be sorted from greatest to least (or vice versa). The signal strengths can be compared to a threshold signal strength and edges can be removed (or ignored) that correspond to signal strengths below the threshold. Each signal strength above the threshold can be represented by an edge (e.g., edge 504A and 504B). Each edge 504A-B represents a conflict (e.g., a communication that causes interference) in communicating by nodes associated with the corresponding vertices 502A-D.

The threshold signal strength can be different for fully orthogonal signals (e.g., signals in different slots and/or using orthogonal frequencies) than the threshold signal strength for signals that only partially orthogonal (e.g., using code division multiple access). For each signal strength above the corresponding threshold assign (if possible) a parameter to one or more of the nodes of the link (sometimes referred to as coloring) to decrease the signal strength to below the threshold (note that one assignment of a code, frequency, or time can reduce multiple signal strengths in the list). Each of the vertices 502A-B that include a signal strength for one or more their links above the threshold can include one or more edges 504A-B connecting vertices of the graph 500. In the example of the graph 500, the vertices 502A-502C include all signal strengths above the corresponding threshold. The edges 504A-B indicate possible conflicts in communication.

Figure 6:
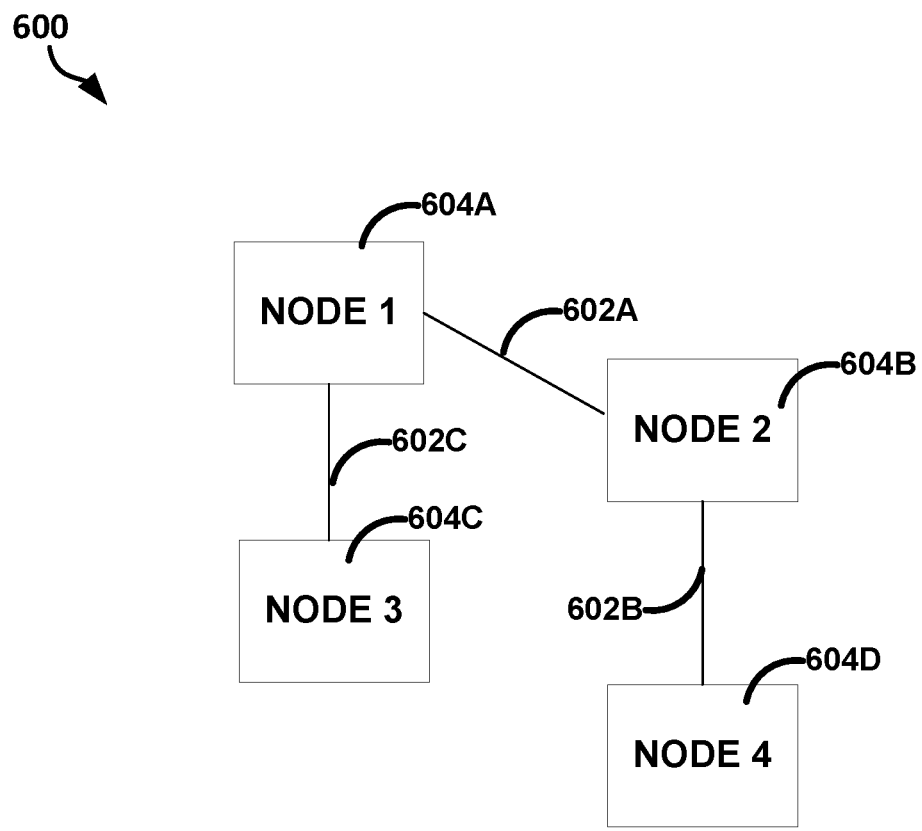
FIG. 6 illustrates, by way of example, a diagram of an embodiment of a function interference graph.

FIG. 6 illustrates, by way of example, a diagram of an embodiment of a function conflict graph 600. The vertices 604A, 604B, 604C, and 604D of the graph 600 represent the nodes 108A-D, respectively. The edges 602A, 602B, 602C, and 602D represent conflicts between the nodes 108A-D performing their respective function(s). For example, the edge 602A represents that when either of nodes 108A and/or 108B performs their function it interferes with communication and/or function performance of the other node 108B and/or 108A, respectively.

The graph 600 and the graph 500 are examples of conflict graphs. The conflict graphs, such as the graphs 500 and 600, can be smashed together, such as to form a universal conflict graph. The universal conflict graph can then be colored. The colors can be mapped to waveform parameters, with different colors representing different waveform parameters, such as to reduce and/or eliminate interference between nodes.

"Smashing" is a term of art. Graph smashing includes aligning like nodes of the graphs and "or" ing all of the edges, such that if one graph includes an edge connecting vertices, the corresponding vertices of the graph produced from the smashing include an edge connecting them.

"Coloring" is a term of art. Graph coloring is a way of labeling vertices of a graph subject to certain constraints. In one or more embodiments, coloring the graph can include ensuring that no two directly connected vertices include the same color. The colors in the embodiments discussed herein can represent one or more of a time, frequency, and/or a code (one or more degrees of freedom available at the scheduling circuitry 312 for making the schedule).

In determining communication or function conflict values, a physical signal to noise ratio (SNR) model can be used. In such a model, SNR between nodes i and j equals the signal strength of signals communicated between the nodes minus an amount of noise realized during the communication. The signal strength can be based on the transmit power, path loss, transmitter gain, and receiver gain. The signal strength can be based on relative positions of the nodes, their orientation, code used for transmission, frequency offset, transmit and/or receive beam direction, or other parameter. The noise can be based on a predicted amount of interference realized by one or more other nodes performing a function and/or communication. The noise can be determined based on the same factors as the signal strength. For example, signal strength can include the transmit power plus the transmit gain, plus the receive gain, minus the path loss.

Edges of the graphs 500 and 600 indicate a conflict between nodes associated with vertices at ends of the corresponding edges. A conflict means that the communication or function associated with one vertex is noise for the vertex on the other end of the vertex. The graphs 500 and 600 can be undirected graphs.

In terms of radar function, a function conflict means that between radar devices m and n, a pulse from one radar device interferes with a return pulse from the other radar device. Eclipsing occurs when the transmission from node m to node n is eclipsed at node n, i.e., it arrives at node n while node n is transmitting. Hence, node n is unable to receive the transmission from m because it does not have the capability to transmit and receive at the same time. The scheduler solves this problem by scheduling the transmission from m so that it arrives at n while the latter is listening (not transmitting) accounting for the signal time of flight between m and n. Eclipsing can be avoided by allocating time offsets (e.g., by the scheduling circuitry 312) correctly. Assuming that nodes i and j are synchronized relative to a time reference and have same pulse repetition frequency (PRF), then for a pulse width, tau, the range (distance between i and j) divided by the speed of the transmission signal, c, should be greater than tau. The scheduler sets the time offsets to ensure this constraint is addressed.

Figure 7:
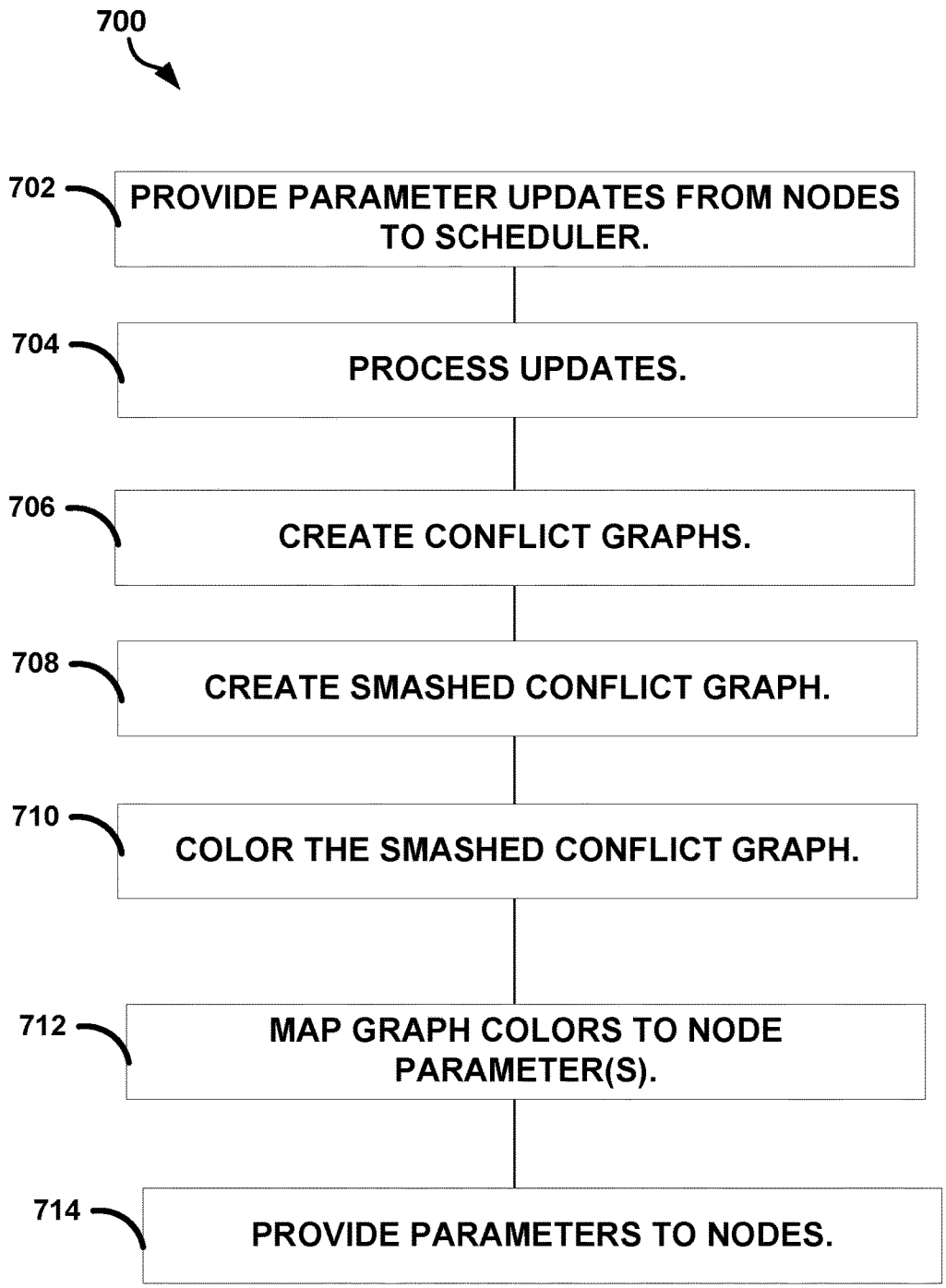
FIG. 7 illustrates, by way of example, a diagram of an embodiment of a method of scheduling transmission of multi-function waveforms.

FIG. 7 illustrates, by way example, a flow diagram of an embodiment of a method 700 for scheduling waveform communication (e.g., multi-function waveform communication) between a plurality of nodes. The method 700 as illustrated includes providing parameter updates from nodes (e.g., nodes 108A-D) to a scheduler (e.g., 102), at operation 702. The method as illustrated includes processing, by the scheduler 102 or the nodes 108A-C, the provided updates, at operation 704. One or more conflict graphs can be created, such as by the scheduler (such as by assuming a worst case interference between nodes), at operation 706. At operation 708, a smashed conflict graph (sometimes referred to as a universal conflict graph) can be created. The method 700 can include coloring the smashed conflict graph, at operation 710. At operation 712, the graph colors can be mapped to multi-function waveform parameters. The method 700 can include providing the mapped multi-function waveform parameters to the corresponding nodes, at operation 714.

The parameter updates at operation 702 can include position, trajectory, function importance (e.g., CONOPS), orientation, frequency at which the communication and/or function can be performed by the node, or other parameter. Note that not all nodes may be in communication range of a centralized scheduler or another node. In such situations, the node providing the update that is out of range of the centralized scheduler or node can provide the update to an intermediate node. The intermediate node can then provide the parameters to the centralized scheduler, node, or another intermediate. This can continue until the centralized scheduler and/or nodes have received information sufficient to process the schedule.

The parameters can be transmitted, such as by the communications circuitry of the node 108A-D. The scheduler (as previously discussed) can include either a centralized scheduler, a distributed scheduler, or a combination thereof. A combination of a centralized scheduler and a distributed scheduler can include one or more nodes of a network determining their own schedule and one or more nodes of the network determining a schedule and providing it to other nodes. The scheduler(s) can process the updates, such as by storing data representative of the updates in a memory of the scheduler.

The operation 706 can be performed for every planning period. A planning period is a time between updates to the schedule. In each planning period, the scheduler can predict a location of each of the nodes at specified number of times into the future (sometimes referred to as snapshots). Each of the snapshots can be based on the updated orientation, position, and/or trajectory provided at operation 702. For each of the snapshots, one or more conflict graphs can be created, such as a graph similar to the graph 500 and/or 600. All of the conflict graphs can be smashed, such as at operation 708, to create the universal graph.

The operation 710 can include using a greedy coloring scheme, such as can include a polynomial time greedy coloring scheme. Graph coloring with distance-1 constraint is NP-hard. The embodiments discussed herein are generally agnostic to the graph coloring scheme implemented. However, not all graph coloring schemes are equal. Different graph coloring schemes can be more resource intensive to implement, such as at the cost of providing a less optimal solution (a schedule that includes more interference between nodes than another coloring scheme). One polynomial time greedy coloring scheme can include a progressive minimum neighbor first (PMNF) scheme. PMNF schemes have a deterministic run time and can handle a relatively large number of colors without requiring too much time to operate. In PMNF, all vertices are sorted by degree (such as by degree of interference). For each vertex, PMNF schemes scans for all neighbor vertices, i, of vertex, j, and colors the neighbors a different color than the vertex, j. After coloring a neighbor vertex, i, it is removed from the list (including the vertices sorted by degree) and the list is resorted. With greedy coloring, the number of colors can be set greater than or equal to the number of nodes represented in the universal graph. If the number of colors (e.g., degrees of freedom) is less than that required to color the universal graph in a conflict-free manner, the scheme can be set to assign a random color to a vertex that is not conflict free after all colors have been used. In one or more embodiments, the color that is currently used least in the colored graph can be used as the color for the vertex to be colored after all other colors have been used. Other coloring schemes exist and can be used in one or more embodiments.

The colors can be mapped to orthogonal parameters of a set of orthogonal parameters (e.g., orthogonal in terms of orthogonal codes, orthogonal times, and/or orthogonal frequencies). In embodiments in which radar eclipsing is a potential issue, time offsets which reduce or eliminate the eclipsing issue can be assigned along with the parameters associated with the coloring.

To help overcome one or more of the problems discussed, the nodes can compute a dynamic schedule (with or without the help of a centralized scheduler). Nodes can be assigned one or more slots in a frame of a plurality of frames of a schedule. In one or more embodiments, the nodes each transmit scheduling data to the other nodes and/or, in some embodiments, to a centralized scheduler. In one or more other embodiments, the nodes each transmit the scheduling data to the scheduler, which then transmits schedule information to the nodes. In such embodiments, the slots of one or more nodes on the schedule can change efficiently between frames. Thus, the same node can communicate in different slots and/or different numbers of slots of consecutive or non-consecutive frames.

In one or more embodiments, a node can be assigned one or more slots in a frame (i.e. a position in a frame) by using a specified function. The function can be based on a variety inputs (e.g., degrees of freedom and/or parameters). The function can be known by each of the nodes 108A-C and/or the scheduler 102 so that each can calculate its position in the frame. In an embodiment in which the nodes communicate their input information to each other, that information is sufficient for each node to calculate every node's position in each frame in a distributed manner. In one or more embodiments in which the nodes 108A-C communicate their input information to the scheduler 102 and not to each other, the scheduler 102 can communicate each (other) node's position in the frame(s) of the schedule to each node 108A-C so that all the nodes know all the other nodes' position in the frame and thus can determine in which frame(s) (e.g., positions in frames) they can communicate and/or perform a function. Alternatively, the scheduler 102 can communicate to the nodes 108A-C only those slots in which the respective nodes are scheduled to communicate and/or perform a function, such as to refrain from communicating other nodes' position information, such as to reduce an amount of information communicated to each node.

Mapping nodes to positions in frames in a manner discussed herein can provide one or more benefits in reduced interference, reliability of communication, and/or satisfying one or more mission objectives.

In one or more embodiments, vertices can be colored in a prioritized order. For example, a node hierarchy can be established. Then, coloring can proceed to eliminate conflicts based on the hierarchy. The node determined to be higher in the hierarchy can have vertices associated with interference therewith before a vertex associated with a lower priority node and not associated with a node with a higher priority. The hierarchy can be determined, at least in part by a demand, an importance of the function performed by the node (as indicated by the mission management circuitry), or other.

Table 2 illustrates an example of ten nodes placed in a hierarchy using the rule: lowest node ID is highest in hierarchy.

TABLE 2

| NODE ID | HIERARCHY |
| --- | --- |
| 39457 | 5 |
| 19473 | 3 |
| 9362 | 1 |
| 87362 | 8 |
| 50938 | 6 |
| 88773 | 9 |
| 10986 | 2 |
| 58993 | 7 |
| 29865 | 4 |
| 98765 | 10 |

In the example of the hierarchy in Table 2, vertices associated with nodes interfering with communication and/or function of the node with node ID 9362 can be colored before other vertices.

Figure 8:
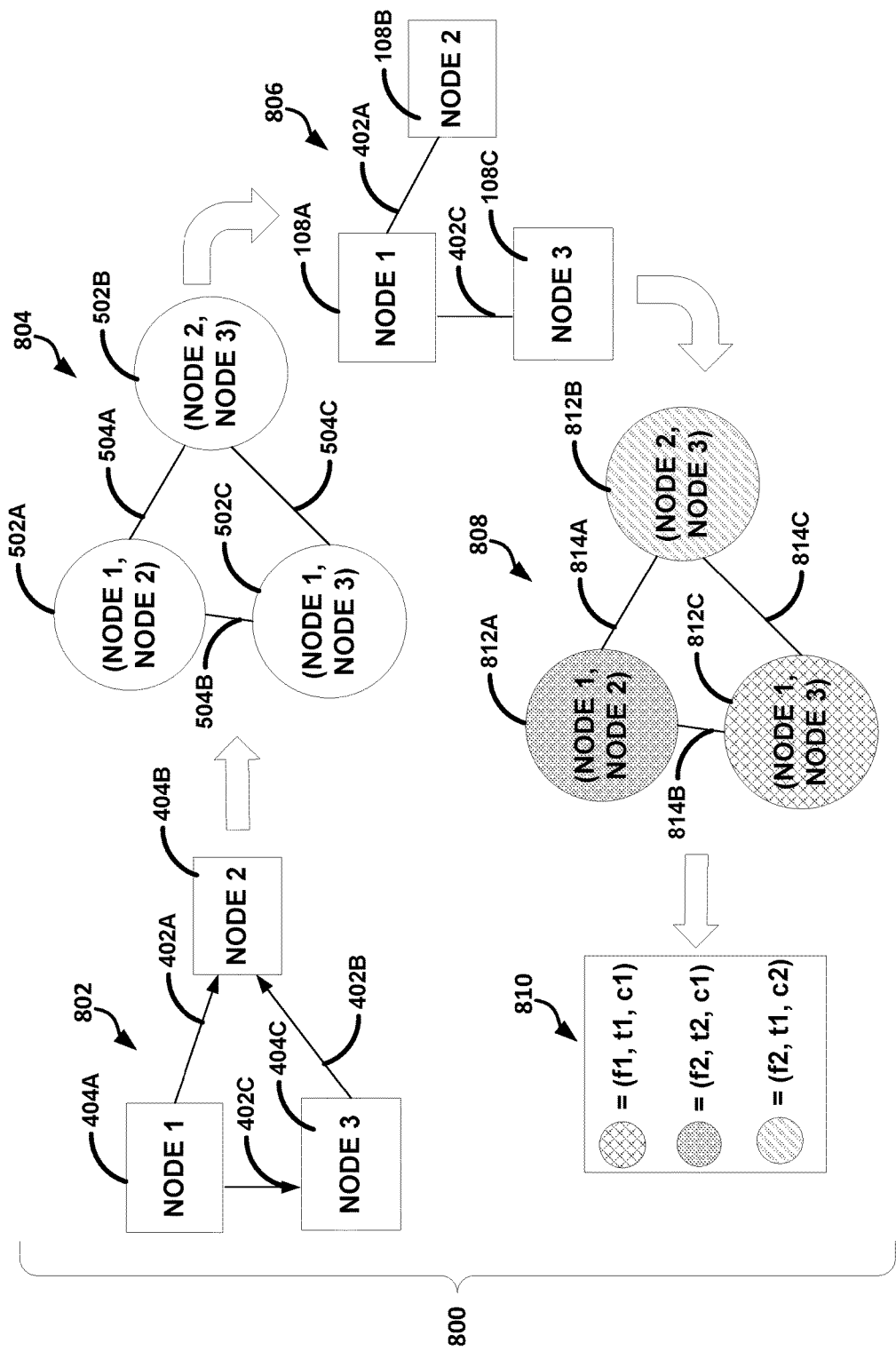
FIG. 8 illustrates, by way of example, a diagram of an embodiment of a method of generating graphs and a corresponding schedule for transmission of multi-function waveforms.

FIG. 8 illustrates, by way of example, a diagram of an embodiment of a method 800 for scheduling access to a shared medium, such as for nodes that transmit multi-function waveforms. A communications connectivity graph 802, such as can be similar that described with regard to FIG. 4, can be created based on data received or otherwise at the mission management circuitry 308 or a memory of the nodes 108A-C or the scheduler 102. A communications interference graph 804 can be created based on the communications connectivity graph 802 and/or other data, such as a transmit power, path loss, gain, or other parameter. The parameter can be stored in a memory of the mission management circuitry 308 or a memory of the nodes 108A-C or the scheduler 102. The communications interference graph 804 can be similar to the communications interference graph 500.

A function interference graph 806, such as can be similar to the graph 600 described with regard to FIG. 6, can be created. In creating any of the communications connectivity graph 802, the communications interference graph 804, and the function interference graph 806, a plurality of respective snapshot graphs (i.e. graphs representing different points in time) can be smashed together. That is, the graph 802 can be the result of smashing multiple communications connectivity graphs together. Similarly, the graph 804 can be the result of smashing multiple communications interference graphs together. Similarly, the graph 806 can be the result of smashing multiple function interference graphs together.

The graphs 804 and 806 can be smashed together and colored, such as to form the graph 808. The graph 808 is a universal conflict graph that includes vertices 812A, 812B, and 812C representing nodes and edges 814A, 814B, and 814C representing conflicts between nodes. The coloring of then vertices can be done as previously discussed. The colors can be translated to parameters 810 that indicate to respective nodes parameters to be followed in performing a function and/or communication. The parameters 810 thus are the schedule.

While embodiments discussed herein generally regard creating a schedule for mobile nodes that transmit waveforms that perform multiple functions (e.g., communication and radar) using graphs, other data structures, such as a hash table or other data structure, can be used in place of one or more of the graphs.

Figure 9:
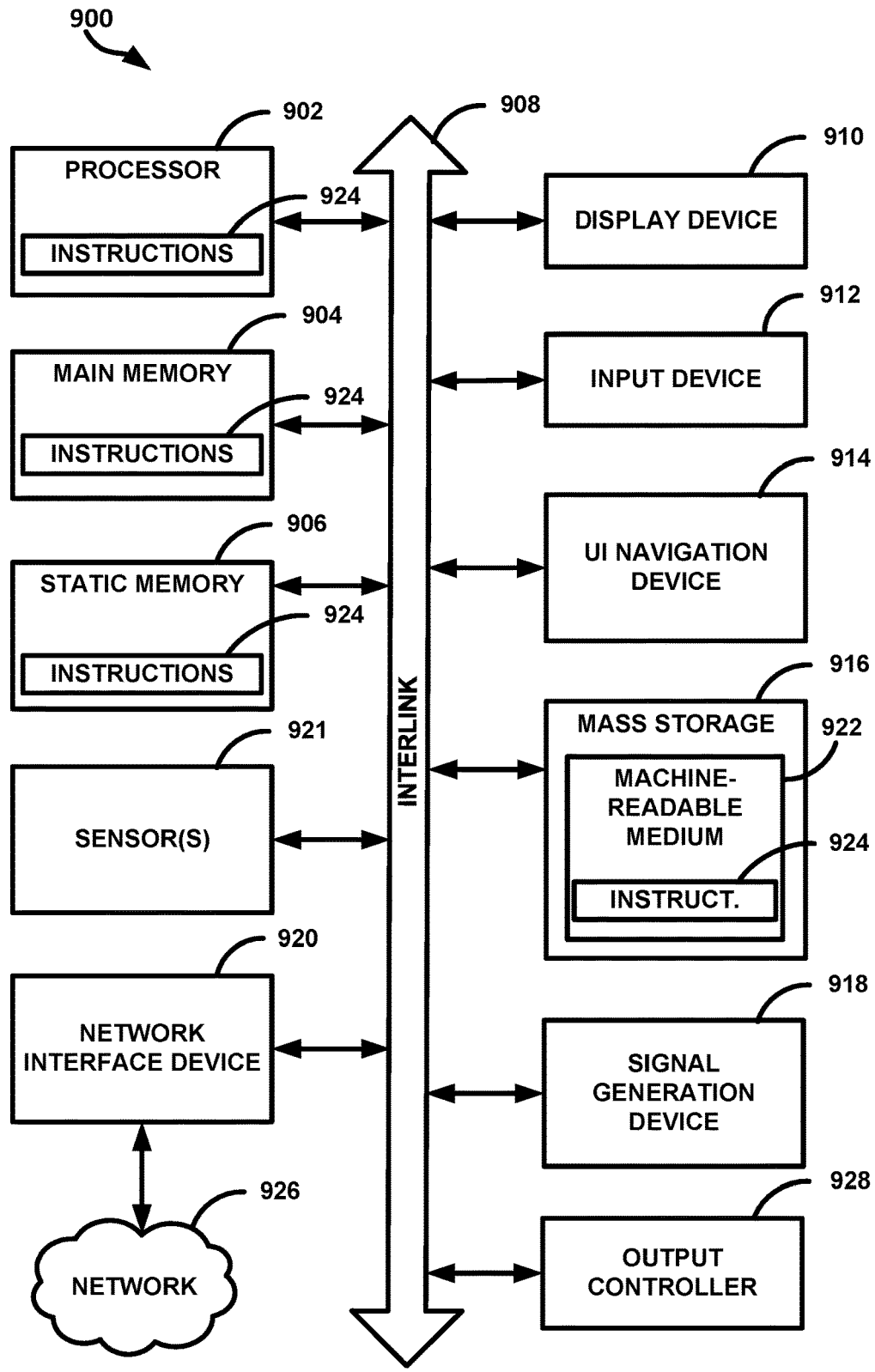
FIG. 9 illustrates, by way of example, a block diagram of an embodiment of a machine on which one or more of the methods as discussed herein can be implemented.

FIG. 9 illustrates, by way of example, a block diagram of an embodiment of a machine 900 on which one or more of the methods as discussed herein can be implemented. In one or more embodiments, one or more items of the scheduler 102 and/or the nodes 108A-C can be implemented by the machine 900. In alternative embodiments, the machine 900 operates as a standalone device or may be connected (e.g., networked) to other machines. In one or more embodiments, the scheduler 102 and/or the nodes 108A-C can include one or more of the items of the machine 900. In a networked deployment, the machine 900 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 900 includes processing circuitry 902 (e.g., a central processing unit (CPU), a graphics processing unit (GPU), an application specific integrated circuit, circuitry, such as one or more transistors, resistors, capacitors, inductors, diodes, logic gates, multiplexers, buffers, modulators, demodulators, radios (e.g., transmit or receive radios or transceivers), sensors, or the like, or a combination thereof), a main memory 904 and a static memory 906, which communicate with each other via a bus 908. The computer system 900 may further include a video display unit 910 (e.g., a liquid crystal display (LCD) or a cathode ray tube (CRT)). The machine 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM). Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

Examples and Additional Notes

Example 1 can include or use subject matter (such as an apparatus, a method, a means for performing operations, or a machine readable memory including instructions that, when performed by the machine, can configure the machine to perform acts), such as can include or use a device for scheduling multi-function waveforms comprising one or more transceivers to receive, from a plurality of nodes, parameters indicating a trajectory and position of each of the plurality of nodes, one or more memories coupled to the one or more transceivers, the one or more memories including mission management information stored thereon indicating which of the plurality of nodes is to communicate with one another and which frequencies each of the nodes can use to transmit a multi-function waveform, a scheduler communicatively coupled to the one or more transceivers to schedule transmission of the multi-function waveforms of the plurality of nodes, the scheduler including processing circuitry configured to: determine which nodes of the plurality of nodes interfere with other nodes in transmitting the multi-function waveform based on the information stored on the one or more memories, create a schedule for transmission of the multi-function waveforms from each of the nodes based on the determined interfering nodes, and provide signals to a transceiver of the one or more transceivers that causes the transceiver to provide data indicative of the schedule to nodes of the plurality of nodes.

Example 2 can include or use, or can optionally be combined with the subject matter of Example 1 to include or use, wherein determining which nodes of the plurality of nodes interfere with other nodes in transmitting the multi-function waveform based on the information stored on the one or more memories includes creating a universal conflict graph that indicates which nodes of the plurality of nodes interfere with other nodes in transmitting the multi-function waveform based on the information stored on the one or more memories, wherein a first function of the multi-function waveform is communication of results of performing a second function of the multi-function waveform and wherein the processing circuitry being configured to create the universal conflict graph includes the processing circuitry further configured to: create a directed communication graph indicating which nodes of the plurality of nodes are to communicate with each other based on the information stored on the one or more memories, create a communications conflict graph based on the parameters and information stored in the one or more memories, the communications conflict graph indicating which communications indicated in the directed communication graph interfere, create a function conflict graph indicating which second function performed by one node of the plurality of nodes interferes with at least one of a second function and communication performed by another node of the plurality of nodes, and create the universal conflict graph based on the communications conflict graph and the function conflict graph.

Example 3 can include or use, or can optionally be combined with the subject matter of at least one of Examples 1-2 to include or use, wherein the processing circuitry is further configured to color the universal conflict graph, each color used in the coloring representing a different set of parameters to be used in performing at least one of the communication and function, each set of parameters including at least one of a frequency, time, and a code.

Example 4 can include or use, or can optionally be combined with the subject matter of Example 3 to include or use, wherein the parameters include a frequency of a plurality of frequencies, a time of a plurality of times, and a code of a plurality of codes.

Example 5 can include or use, or can optionally be combined with the subject matter of at least one of Examples 1-4 to include or use, wherein creation of the universal conflict graph includes the processing circuitry configured to smash the communications conflict graph with the function conflict graph.

Example 6 can include or use, or can optionally be combined with the subject matter of Example 5 to include or use, wherein creation of the communications conflict graph includes creation of a plurality of communications conflict graphs at different respective snapshots based on the received parameters and smashing the plurality of communications conflict graphs together.

Example 7 can include or use, or can optionally be combined with the subject matter of Example 6 to include or use, wherein creation of the function conflict graph includes creation of a plurality of function conflict graphs at different respective snapshots based on the received parameters and smashing the plurality of function conflict graphs together.

Example 8 can include or use, or can optionally be combined with the subject matter of at least one of Examples 1-7 to include or use, wherein the processing circuitry configured to color the graph includes the processing circuitry configured to prioritize resolution of one or more conflicts based on at least one of a mission objective, a priority of the communication or function associated with the conflict, and a priority of a node involved with the conflict.

Example 9 can include or use, or can optionally be combined with the subject matter of at least one of Examples 1-8 to include or use, wherein the parameters further include a demand for communication and wherein the processing circuitry configured to color the graph includes the processing circuitry configured to prioritize coloring of a vertex associated with a node associated with a greater demand.

Example 10 can include or use, or can optionally be combined with the subject matter of at least one of Examples 1-9 to include or use, wherein processing circuitry configured to provide the data indicative of the schedule includes the processing circuitry configured to provide encrypted seed data, that after decryption by the node provides the node with sufficient data to determine a time, frequency, and code to use for at least one of communication and function performance.

Example 11 can include or use, or can optionally be combined with the subject matter of at least one of Examples 1-10 to include or use, wherein the a first function of the multi-function waveform includes radar and a second function of the multi-function waveform includes communication.

Example 12 can include or use subject matter (such as an apparatus, a method, a means for performing operations, or a machine readable memory including instructions that, when performed by the machine, can configure the machine to perform acts), such as can include or use a method for scheduling a shared resource comprising: receiving, from a plurality of nodes, parameters indicating a trajectory and position of each of the plurality of nodes, creating, using processing circuitry of a scheduler, a directed communication graph indicating which nodes of the plurality of nodes are to communicate with each other, creating a communications conflict graph indicating which communications indicated in the directed communication graph interfere, creating a function conflict graph indicating which function performed by one node of the plurality of nodes interferes with at least one of a function and communication performed by another node of the plurality of nodes, creating a universal conflict graph based on the communications conflict graph and the function conflict graph, creating a schedule for communication and function performance for each of the nodes based on the universal conflict graph, and providing data indicative of the schedule to nodes of the plurality of nodes.

Example 13 can include or use, or can optionally be combined with the subject matter of Example 12 to include or use coloring the universal conflict graph, each color used in the coloring representing a different set of parameters to be used in performing at least one of the communication and function, the parameters including at least one of a frequency, time, and a code.

Example 14 can include or use, or can optionally be combined with the subject matter of Example 13 to include or use, wherein the parameters include a frequency of a plurality of frequencies, a time of a plurality of times, and a code of a plurality of codes.

Example 15 can include or use, or can optionally be combined with the subject matter of at least one of Examples 12-14 to include or use, wherein creating the universal conflict graph includes smashing the communications conflict graph with the function conflict graph.

Example 16 can include or use, or can optionally be combined with the subject matter of Example 15 to include or use, wherein creating the communications conflict graph includes creating a plurality of communications conflict graphs at different respective snapshots based on the received parameters and smashing the plurality of communications conflict graphs together.

Example 17 can include or use, or can optionally be combined with the subject matter of Example 16 to include or use, wherein creating the function conflict graph includes creating a plurality of function conflict graphs at different respective snapshots based on the received parameters and smashing the plurality of function conflict graphs together.

Example 18 can include or use, or can optionally be combined with the subject matter of at least one of Examples 12-17 to include or use, wherein coloring the graph includes prioritizing resolution of one or more conflicts based on at least one of a mission objective, a priority of the communication or function associated with the conflict, and a priority of a node involved with the conflict.

Example 19 can include or use, or can optionally be combined with the subject matter of at least one of Examples 12-18 to include or use, wherein the parameters further include a demand for communication and wherein coloring the graph includes prioritizing coloring of a node associated with a greater demand.

Example 20 can include or use, or can optionally be combined with the subject matter of at least one of Examples 12-19 to include or use, wherein providing the data indicative of the schedule includes providing encrypted seed data, that after decryption by the node provides the node with sufficient data to determine a time, frequency, and code to use for at least one of communication and function performance.

Example 21 can include or use, or can optionally be combined with the subject matter of at least one of Examples 12-21 to include or use, wherein the communication and function for each of the plurality of nodes is accomplished using a multi-function waveform that uses the same radio and same frequency spectrum to perform both a radar function and communication at a same time.

Example 22 can include or use subject matter (such as an apparatus, a method, a means for performing operations, or a machine readable memory including instructions that, when performed by the machine, can configure the machine to perform acts), such as can include or use a non-transitory machine-readable storage device including instructions stored thereon which, when executed by a machine, cause the machine to perform operations comprising: receiving, from a plurality of nodes, parameters indicating a trajectory and position of each of the plurality of nodes, creating a directed communication graph indicating which nodes of the plurality of nodes are to communicate with each other, creating a communications conflict graph indicating which communications indicated in the directed communication graph interfere, creating a function conflict graph indicating which function performed by one node of the plurality of nodes interferes with at least one of a function and communication performed by another node of the plurality of nodes, creating a universal conflict graph based on the communications conflict graph and the function conflict graph, creating a schedule for communication and function performance for each of the nodes based on the universal conflict graph, and providing data indicative of the schedule to nodes of the plurality of nodes.

Example 23 can include or use, or can optionally be combined with the subject matter of Example 22 to include or use, instructions stored thereon which, when executed by the machine, cause the machine to perform operations further comprising coloring the universal conflict graph, each color used in the coloring representing a different set of parameters to be used in performing at least one of the communication and function, the parameters including at least one of a frequency, time, and a code.

Example 24 can include or use, or can optionally be combined with the subject matter of Example 23 to include or use, wherein the parameters include a frequency of a plurality of frequencies, a time of a plurality of times, and a code of a plurality of codes.

Example 25 can include or use, or can optionally be combined with the subject matter of at least one of Examples 22-24 to include or use, wherein the instructions for creating the universal conflict graph include instructions for smashing the communications conflict graph with the function conflict graph.

Example 26 can include or use, or can optionally be combined with the subject matter of Example 25 to include or use, wherein the instructions for creating the communications conflict graph include instructions for creating a plurality of communications conflict graphs at different respective snapshots based on the received parameters and smashing the plurality of communications conflict graphs together.

Example 27 can include or use, or can optionally be combined with the subject matter of Example 26 to include or use, wherein the instructions for creating the function conflict graph include instructions creating a plurality of function conflict graphs at different respective snapshots based on the received parameters and smashing the plurality of function conflict graphs together.

Example 28 can include or use, or can optionally be combined with the subject matter of at least one of Examples 22-27 to include or use, wherein the instructions for coloring the graph include instructions for prioritizing resolution of one or more conflicts based on at least one of a mission objective, a priority of the communication or function associated with the conflict, and a priority of a node involved with the conflict.

Example 29 can include or use, or can optionally be combined with the subject matter of at least one of Examples 22-28 to include or use, wherein the parameters further include a demand for communication and wherein coloring the graph includes prioritizing coloring of a node associated with a greater demand.

Example 30 can include or use, or can optionally be combined with the subject matter of at least one of Examples 22-29 to include or use, wherein the instructions for providing the data indicative of the schedule include instructions for providing encrypted seed data, that after decryption by the node provides the node with sufficient data to determine a time, frequency, and code to use for at least one of communication and function performance.

Example 31 can include or use, or can optionally be combined with the subject matter of at least one of Examples 22-30 to include or use, wherein the communication and function for each of the plurality of nodes is accomplished using a multi-function waveform that uses the same radio and same frequency spectrum to perform both a radar function and communication at a same time.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device for scheduling transmission of multi-function waveforms comprising:
   one or more transceivers to receive, from a plurality of nodes, parameters indicating a trajectory and position of each of the plurality of nodes;
   one or more memories coupled to the one or more transceivers, the one or more memories including mission management information stored thereon indicating which of the plurality of nodes arg to communicate with one another and which frequencies each of the plurality of nodes can use to transmit a multi-function waveform of the multi-function waveforms;
   a scheduler communicatively coupled to the one or more transceivers to schedule transmission of the multi-function waveforms, the scheduler including processing circuitry configured to:
   determine which of the plurality of nodes interfere with other nodes in transmitting the multi-function waveform based on the mission management information stored on the one or more memories;
   create a schedule for transmission of the multi-function waveforms from each of the plurality of nodes based on the determined interfering nodes;
   provide signals to a transceiver of the one or more transceivers that causes the transceiver to provide data indicative of the schedule to the plurality of nodes; and
   wherein determining which nodes of the plurality of nodes interfere with other nodes in transmitting the multi-function waveform based on the mission management information stored on the one or more memories includes creating a universal conflict graph that indicates which nodes of the plurality of nodes interfere with other nodes in transmitting the multi-function waveform based on the information stored on the one or more memories.

2. The device of claim 1, wherein a first function of the multi-function waveform is in communication of results of performing a second function of the multi-function waveform and wherein the processing circuitry being configured to create the universal conflict graph includes further includes:
   create a directed communication graph indicating which nodes of the plurality of nodes are to communicate with each other based on the information stored on the one or more memories;
   create a communications conflict graph based on the parameters and information stored in the one or more memories, the communications conflict graph indicating which communications indicated in the directed communication graph interfere;
   create a function conflict graph indicating which second function performed by one node of the plurality of nodes interferes with at least one of a second function and communication performed by another node of the plurality of nodes; and
   create the universal conflict graph based on the communications conflict graph and the function conflict graph.

3. The device of claim 2, wherein the processing circuitry is further configured to color the universal conflict graph by a plurality of colors, wherein each color of the plurality of colors used in the coloring representing a different set of parameters to be used in performing at least one of the communication and function, each set of parameters including at least one of a frequency, time, and a code.

4. The device of claim 3, wherein the parameters include a frequency of a plurality of frequencies, a time of a plurality of times, and a code of a plurality of codes.

5. The device of claim 3, wherein the processing circuitry configured to color the universal conflict graph includes the processing circuitry configured to prioritize resolution of one or more conflicts based on at least one of a mission objective, a priority of the communication or function associated with the conflict, and a priority of a node involved with the conflict.

6. The device of claim 3, wherein the parameters further include a demand for communication and wherein the processing circuitry configured to color the universal conflict graph includes the processing circuitry configured to prioritize coloring of a vertex associated with a node associated with a greater demand.

7. The device of claim 2, wherein creation of the universal conflict graph includes smashing the communications conflict graph with the function conflict graph.

8. The device of claim 7, wherein creation of the communications conflict graph includes creation of a plurality of communications conflict graphs at different respective snapshots based on the received parameters and smashing the plurality of communications conflict graphs together.

9. The device of claim 8, wherein creation of the function conflict graph includes creation of a plurality of function conflict graphs at different respective snapshots based on the received parameters and smashing the plurality of function conflict graphs together.

10. The device of claim 2, wherein the first function of the multi-function waveform includes radar and the second function of the multi-function waveform includes communication.

11. The device of claim 1, wherein processing circuitry configured to provide the data indicative of the schedule includes the processing circuitry configured to provide encrypted seed data, that after decryption by a node of the plurality of nodes provides the node with sufficient data to determine a time, frequency, and code to use for at least one of communication and function performance.

12. A method for scheduling a shared resource comprising:
   receiving, from a plurality of nodes, parameters indicating a trajectory and position of each of the plurality of nodes;
   creating, using processing circuitry of a scheduler, a directed communication graph indicating which nodes of the plurality of nodes are to communicate with each other;
   creating a communications conflict graph indicating which communications indicated in the directed communication graph interfere;
   creating a function conflict graph indicating which function performed by one node of the plurality of nodes interferes with at least one of a function and communication performed by another node of the plurality of nodes;
   creating a universal conflict graph based on the communications conflict graph and the function conflict graph;
   creating a schedule for communication and function performance for each of the nodes based on the universal conflict graph; and
   providing data indicative of the schedule to nodes of the plurality of nodes.

13. The method of claim 12, further comprising coloring, using a plurality of colors, the universal conflict graph, each color of the plurality of colors representing a different set of parameters to be used in performing at least one of the communication and function, the parameters including at least one of a frequency, time, and a code.

14. The method of claim 13, wherein the parameters include a frequency of a plurality of frequencies, a time of a plurality of times, and a code of a plurality of codes.

15. The method of claim 12, wherein creating the universal conflict graph includes smashing the communications conflict graph with the function conflict graph.

16. The method of claim 15, wherein creating the communications conflict graph includes creating a plurality of communications conflict graphs at different respective snapshots based on the received parameters and smashing the plurality of communications conflict graphs together.

17. A non-transitory machine-readable storage device including instructions stored thereon which, when executed by a machine, cause the machine to perform operations comprising:
   receiving, from a plurality of nodes, parameters indicating a trajectory and position of each of the plurality of nodes;
   creating a directed communication graph indicating which nodes of the plurality of nodes are to communicate with each other;
   creating a communications conflict graph indicating which communications indicated in the directed communication graph interfere;
   creating a function conflict graph indicating which function performed by one node of the plurality of nodes interferes with at least one of a function and communication performed by another node of the plurality of nodes;
   creating a universal conflict graph based on the communications conflict graph and the function conflict graph;
   creating a schedule for communication and function performance for each of the nodes based on the universal conflict graph; and
   providing data indicative of the schedule to nodes of the plurality of nodes.

18. The non-transitory machine-readable storage device of claim 17, the operations further comprising, coloring, using a plurality of colors, the universal conflict graph, each color of the plurality of colors representing a different set of parameters to be used in performing at least one of the communication and function, the parameters including at least one of a frequency, time, and a code and wherein the instructions for coloring the universal conflict graph include instructions for prioritizing resolution of one or more conflicts based on at least one of a mission objective, a priority of the communication or function associated with the conflict, and a priority of a node involved with the conflict.

19. The non-transitory machine-readable storage device of claim 17, wherein the parameters further include a demand for communication and wherein coloring the universal conflict graph includes prioritizing coloring of a node associated with a greater demand.

20. The non-transitory machine-readable storage device of claim 17, wherein the instructions for providing the data indicative of the schedule include instructions for providing encrypted seed data, that after decryption by a node of the plurality of nodes provides the node with sufficient data to determine a time, frequency, and code to use for at least one of communication and function performance.

* * * * *

UNITED STATES PATENT AND TRADEMARK OFFICE
CERTIFICATE OF CORRECTION

PATENT NO. : 10,285,190 B2  
APPLICATION NO. : 15/385821  
DATED : May 7, 2019  
INVENTOR(S) : Khoury et al.

Page 1 of 1

It is certified that error appears in the above-identified patent and that said Letters Patent is hereby corrected as shown below:

In the Specification

In Column 2, Line 34, after "platforms", insert --.--

In Column 3, Line 29, delete "1088A-C" and insert --108A-C-- therefor

In Column 4, Line 11, delete "102" and insert --104-- therefor

In Column 5, Line 5, after "schedule", insert --.--

In Column 6, Line 1, delete "306" and insert --308-- therefor

In Column 6, Line 5, delete "306" and insert --308-- therefor

In Column 8, Line 22, after "vertex", delete "represents"

In Column 9, Line 12, delete "ing" and insert --aligning-- therefor

In Column 14, Line 7, delete "(EPROM)." and insert --(EPROM),-- therefor

In the Claims

In Column 19, Line 15, in Claim 1, delete "arg" and insert --are-- therefor

In Column 19, Line 46, in Claim 2, after "graph", delete "includes"

Signed and Sealed this  
Nineteenth Day of January, 2021

Andrei Iancu  
*Director of the United States Patent and Trademark Office*